United States Patent Office 3,047,974
Patented Aug. 7, 1962

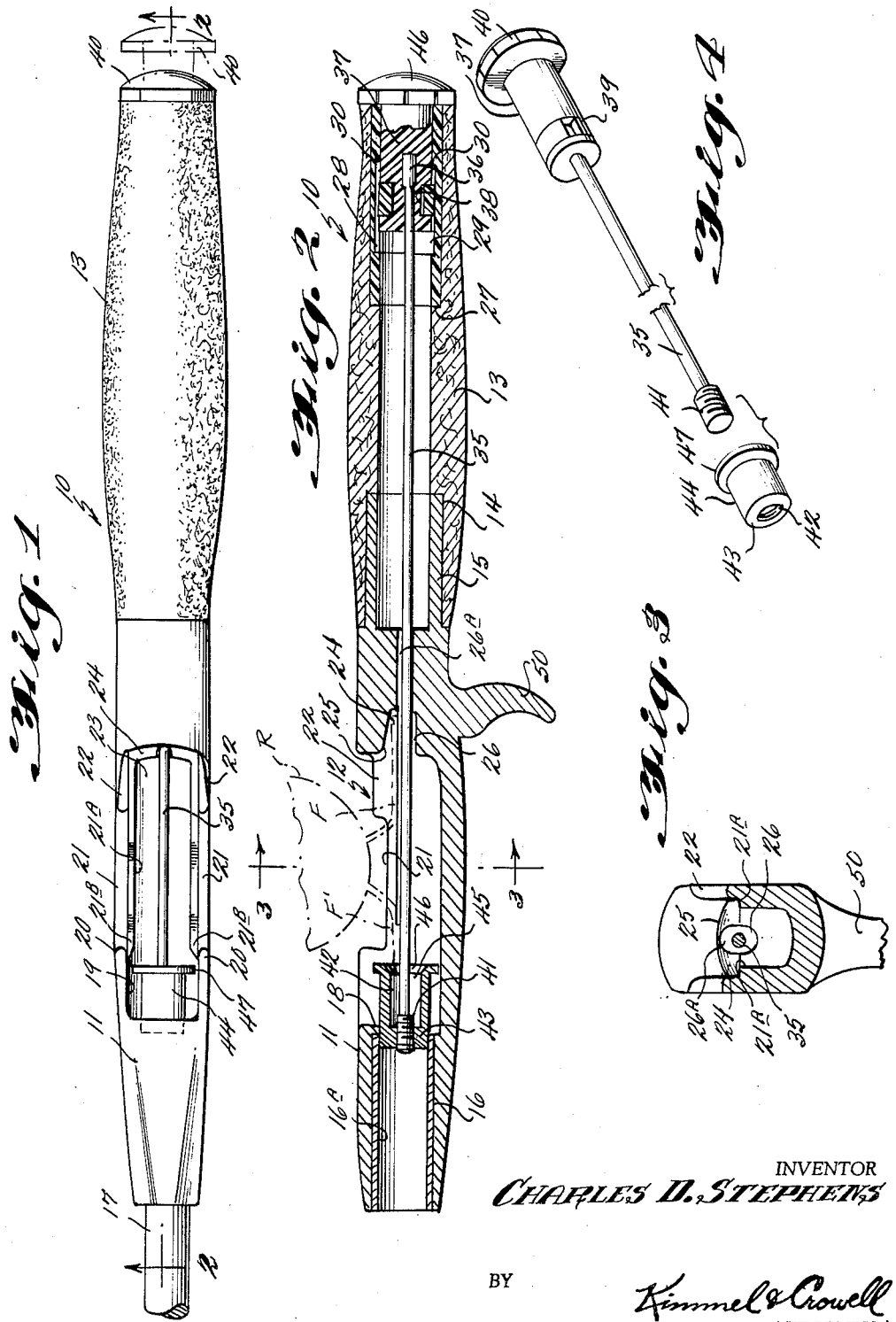

3,047,974
FISHING ROD HANDLE AND REEL CLAMP
Charles D. Stephens, San Antonio, Tex., assignor to
Fredric P. Schwab, San Antonio, Tex.
Filed Nov. 18, 1959, Ser. No. 853,724
5 Claims. (Cl. 43—22)

This invention relates to a fishing rod handle and reel clamp, and comprises an improvement over my Patent No. 2,667,713 dated February 2, 1954 entitled Fishing Rod and Reel Clamp.

A primary object of the invention is the provision of an improved reel clamp for clamping a fishing reel to a handle which is wholly enclosed within the handle, thus obviating exposed operating parts, which reduces the possibility of wetting the operating mechanism and, hence, reduces the tendency of minerals in suspension in the water becoming residual matter encrusted on the operating parts which tends to freeze the operating mechanism and render the same partially or totally inoperable.

An additional object of the invention is the provision of a locking member which is rotatably movable, whereby the impact of tightening may be taken at varying points on the beveled face thereof, thus obviating the locking motion of a conventional reel when mounted on a plane seat. It is pointed out that the longitudinal opposed seating faces of the concave bottom of a conventional reel foot are not true alignment, and by virtue of the rotative movement of the instant locking member, such misalignment is compensated for, providing a more stable reel mounting.

An additional object of the invention is the provision of a locking mechanism which functions along the longitudinal axis of the handle, while the reel seat is above this axis, whereby the end of the reel foot contacting the beveled face of the locking member is forced downward clampingly to engage the reel seat when locked.

A further object of the invention is the provision of such a locking device wherein the operating member passes beneath and through the concavity of the reel foot, thus affording secure and reliable fastening of elements, arrangements of parts, and features of construction, all as will be more fully pointed out hereinafter, and disclosed in the accompanying drawing wherein:

FIGURE 1 is a top plan view of one form of fishing rod handle embodying the instant locking mechanism;

FIGURE 2 is a sectional view taken substantially along the line 2—2 of FIGURE 1, as viewed in the direction indicated by the arrows;

FIGURE 3 is a sectional view taken substantially along the line 3—3 of FIGURE 2, as viewed in the direction indicated by the arrows; and FIGURE 4 is an exploded perspective view of the locking mechanism disassociated from the handle.

Similar reference characters refer to similar parts throughout the several views of the drawing.

Having reference now to the drawing, there is generally indicated at 10 a fishing pole handle which is comprised of a forward portion 11, preferably constructed of metal or the like, which includes a reel seat, generally indicated at 12, and a cork handle portion 13. The handle portion 13 is of hollow tubular construction, and is recessed, as at 14, to seat on an integral extending flange 15 forming a portion of the metallic reel seat member 12.

The forward end of the portion 11 is provided with a central bore 16, which has positioned therein a liner 16A forming a socket for the reception of the pole 17, which may be secured in the socket 16A in any desired manner.

The liner 16A terminates in an annular recess 18 interiorly of the bore 16, the top portion of the bore being cut away, as indicated at 19, forming two oppositely disposed vertical flanges 20. The flanges 20 terminate at the top surfaces 21 of the flat reel receiving seat, which surfaces have at their ends additional vertical opposed flanges 22 on opposite sides of the cut away portion 23.

The interior of the member 11 at the base of cut away portion 23 is provided with an arcuate reel foot receiving seat 24, the top surface of which is beveled, as at 25, to provide a guide for the reel foot, this stationary seat serving to hold one of the two conventional opposed reel feet in locked position. A recess 26 is formed at the bottom of the cut away portion 23, and terminates in a bore 26A which extends through the hollow flange 15 into the hollow interior of the cork handle 13. The opposite end of the cork handle 13 is cut away, as at 27, and receives a sleeve 28 which is fixedly secured therein. The sleeve 28 is formed with an annular cut away portion 29, which provides shoulders 30 at the opposite ends thereof, the purpose of which will be more fully described hereinafter.

The reel locking mechanism per se comprises an elongated rod 35 which is provided at one end with an enlarged portion 36 which serves to secure a cylindrical head portion 37 thereon, the head portion 37 being provided with an annular groove 38 in which is positioned a split expansible ring 39. The outer extremity of the portion 37 is provided with a knurled head 40, by means of which the rod 35 may be either moved linearly, or rotated, for a purpose to be more fully described hereinafter.

When the head member 40 is juxtaposed to the end of the cork handle 13, in the full line position as shown in FIGURE 1, the expansible ring 39 is engaged by the shoulders 30 which prevents the accidental withdrawal of the rod, and its associated elements, from the interior of the handle, unless a moderate force is exerted thereon, under which circumstances the rod may be withdrawn for cleaning, or other desired purposes.

The opposite end of the rod 35 comprises an enlarged threaded head 41, which is adapted rotatably to engage in a threaded opening 42 in the base 43 of a cup-shaped clamping member 44. The member 44 has an interior tubular clamping surface 45, the outer face of which is beveled, as at 46, and is provided with a flange 47, which in the retracted or unlocking position of adjustment of the device is adapted to seat in the recess 18, so that the clamping member is thus flush with the end of the reel seat. When it is desired to clamp the feet F and F' of a reel R, the latter being indicated in dotted lines in FIGURE 2, the foot F' is seated in the recessed seat 24, being guided by the bevel 25, it being assumed that the cup-shaped member 44 is in retracted or nonclamping position. The reel feet seat on flanges 21A which extend parallel with and slightly below the rim of the reel seat 24, which are tapered as at 21B to permit the passage of flange 47 between the ends thereof. The knurled head 40 is then rotated, whereupon the engagement of the threaded head and/or end 41 with the threaded bore or opening 42 moves the cup-shaped member 44 to clamping position, as indicated in FIGURES 1 and 2, the bevel 46 serving effectively to guide the reel foot F into engagement in the interior 45 of the cup-shaped member 44. Continued rotation of knurled head 40 will obviously cause a tight engagement of the movable clamping cup 44 firmly to wedge the opposite reel foot F' into the recess 24 forming the reel seat, thus firmly securing the parts in related assembly. Reverse rotation of the knurled head 40 will obviously cause the cup 44 to move inwardly of the sleeve 16A, and release the engagement of the reel R with the reel feet.

When it is desired to disassemble the device for cleaning or the like, the head 40 may be rotated until the threaded head 41 is completely disengaged from its associated threaded bore, and the rod 35 pulled outwardly through the bore 26A and the hollow interior of the cork handle 13. At this time the cup-shaped member 44 may be readily removed from the open reel seat by simply inverting the handle.

It is to be noted that the operating rod 35 is so positioned and arranged as to extend within the concavity of the reel feet, and lie closely adjacent the underside of the reel feet. The flanges 21A also serve firmly to hold the reel feet against displacement, so that a firm, secure and reliable lock is effected at all times.

The split ring 39, and its contact with the shoulders 30, retains the locking assembly securely within the handle at all times, whether a reel is in position on the seat, or not.

The handle portion 13 is provided with the conventional depending finger-engaging grip member 50 for facilitating the handling of the rod and reel.

From the foregoing it will now be seen that there is herein provided an improved lock for fishing reels, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A locking device for fishing reels comprising, in combination, with a fishing pole handle having a cut away portion forming a reel seat, there being a recess at one end of said cut away portion adapted to receive one foot of a fishing reel, and there being a bore extending through said handle and recess into said cut away portion, an elongated rigid clamping rod extending through said bore and recess into said cut away portion adjacent the top of said cutaway portion and adapted to engage against the underside of the reel foot, a handle member fixed to one end of said rod exteriorly of said handle, a threaded end portion on the other end of said rod, a tubular reel foot clamping cup having a base and a threaded bore in said base threadedly engaging said threaded end portion, and an open mouth, an annular flange surrounding said open mouth and slidably seating on the bottom of said cut away portion, said handle having an opposed cylindrical recess therein at the end opposite said recess at one end for the reception of said cup, said cylindrical recess having a shoulder therein for the reception of said flange to serve as a limit stop for movement of said cup rotation of said handle member causing rotation of said rod and through the engagement of said threaded end in said threaded bore causing linear movement of said clamping cup, said cup being adapted to clampingly engage the other reel foot of the reel to hold the same securely on said reel seat.

2. A locking device for fishing reels comprising, in combination, with a fishing pole handle having a cut away portion forming a reel seat, there being a recess at one end of said cut away portion adapted to receive one foot of a fishing reel, and there being a bore extending through said handle and recess into said cut away portion, an elongated rigid clamping rod extending through said bore and recess into said cut away portion adjacent the top of said cutaway portion and adapted to engage against the underside of the reel foot, a handle member fixed to one end of said rod exteriorly of said handle, a threaded end portion on the other end of said rod, a tubular reel foot clamping cup having a base and a threaded bore in said base threadedly engaging said threaded end portion, and an open mouth, an annular flange surrounding said open mouth and slidably seating on the bottom of said cut away portion, said handle having an opposed cylindrical recess therein at the end opposite said recess at one end for the reception of said cup, said cylindrical recess having a shoulder therein for the reception of said flange to serve as a limit stop for movement of said cup rotation of said handle member causing rotation of said rod and through the engagement of said threaded end in said threaded bore causing linear movement of said clamping cup, said cup being adapted to clampingly engage the other reel foot of the reel to hold the same securely on said reel seat, said recess at one end having a beveled edge, and said reel clamping cup having a beveled edge to facilitate the engagement of the reel feet therein.

3. A locking device for fishing reels comprising, in combination, with a fishing pole handle having a cut away portion forming a reel seat, there being a recess at one end of said cut away portion adapted to receive one foot of a fishing reel, and there being a bore extending through said handle and recess into said cut away portion, an elongated rigid clamping rod extending through said bore and recess into said cut away portion adjacent the top of said cutaway portion and adapted to engage against the underside of the reel foot, a handle member fixed to one end of said rod exteriorly of said handle, a threaded end portion on the other end of said rod, a tubular reel foot clamping cup having a base and a threaded bore in said base threadedly engaging said threaded end portion, and an open mouth, an annular flange surrounding said open mouth and slidably seating on the bottom of said cut away portion, said handle having an opposed cylindrical recess therein at the end opposite said recess at one end for the reception of said cup, said cylindrical recess having a shoulder therein for the reception of said flange to serve as a limit stop for movement of said cup rotation of said handle member causing rotation of said rod and through the engagement of said threaded end in said threaded bore causing linear movement of said clamping cup, said cup being adapted to clampingly engage the other reel foot of the reel to hold the same securely on said reel seat, said recess at one end having a beveled edge, and said reel clamping cup having a beveled edge to facilitate the engagement of the reel feet therein, said bore being positioned to align and seat said clamping rod within the concavity of the reel feet and closely adjacent thereto.

4. A locking device for fishing reels comprising, in combination, with a fishing pole handle having a cut away portion forming a reel seat, there being a recess at one end of said cut away portion adapted to receive one foot of a fishing reel, and there being a bore extending through said handle and recess into said cut away portion, an elongated rigid clamping rod extending through said bore and recess into said cut away portion adjacent the top of said cutaway portion and adapted to engage against the underside of the reel foot, a handle member fixed to one end of said rod exteriorly of said handle, a threaded end portion on the other end of said rod, a tubular reel foot clamping cup having a base and a threaded bore in said base threadedly engaging said threaded end portion, and an open mouth, an annular flange surrounding said open mouth and slidably seating on the bottom of said cut away portion, said handle having an opposed cylindrical recess therein at the end opposite said recess at one end for the reception of said cup, said cylindrical recess having a shoulder therein for the reception of said flange to serve as a limit stop for movement of said cup rotation of said handle member causing rotation of said rod and through the engagement of said threaded end in said threaded bore causing linear movement of said clamping cup, said cup being adapted to clampingly engage the other reel foot of the reel to hold the same securely on said reel seat, said recess at one end having a beveled edge, and said reel clamping cup having a beveled edge to facilitate the engagement of the reel feet therein, said bore being positioned to align and seat said clamping rod within the concavity of the reel feet and closely adjacent thereto, said reel seat having internally positioned parallel flanges therein on which the reel feet are adapted to seat.

5. A locking device for fishing reels comprising, in combination, with a fishing pole handle having a cut away portion forming a reel seat, there being a recess at one end of said cut away portion adapted to receive one foot of a fishing reel, and there being a bore extending through said handle and recess into said cut away portion, an elongated rigid clamping rod extending through said bore and recess into said cut away portion adjacent the top of said cutaway portion and adapted to engage against the underside of the reel foot, a handle member fixed to one end of said rod exteriorly of said handle, a threaded end portion on the other end of said rod, a tubular reel foot clamping cup having a base and a threaded bore in said base threadedly engaging said threaded end portion, and an open mouth, an annular flange surrounding said open mouth and slidably seating on the bottom of said cut away portion, said handle having an opposed cylindrical recess therein at the end opposite said recess at one end for the reception of said cup, said cylindrical recess having a shoulder therein for the reception of said flange to serve as a limit stop for movement of said cup rotation of said handle member causing rotation of said rod and through the engagement of said threaded end in said threaded bore causing linear movement of said clamping cup, said cup being adapted to clampingly engage the other reel foot of the reel to hold the same securely on said reel seat, said recess at one end having a beveled edge, and said reel clamping cup having a beveled edge to facilitate the engagement of the reel feet therein, said bore being positioned to align and seat said clamping rod within the concavity of the reel feet and closely adjacent thereto, said reel seat having internally positioned parallel flanges therein on which the reel feet are adapted to seat, said handle having an interiorly positioned sleeve at the end thereof opposite said reel seat, a shoulder formed on said sleeve, an extension on said handle portion engaging in said sleeve, and an expansible split ring on said extension engageable with said shoulder to preclude accidental disalignment of said rod from said handle.

References Cited in the file of this patent

UNITED STATES PATENTS

| | | |
|---|---|---|
| 2,182,901 | Moulton | Dec. 12, 1939 |
| 2,534,027 | Irvan | Dec. 12, 1950 |
| 2,554,787 | McGuire | May 29, 1951 |
| 2,667,713 | Stephens | Feb. 2, 1954 |
| 2,782,547 | McMullin | Feb. 26, 1957 |